(12) United States Patent
Huntress

(10) Patent No.: US 6,782,101 B1
(45) Date of Patent: Aug. 24, 2004

(54) ENCRYPTION USING FRACTAL KEY

(75) Inventor: Gary B. Huntress, Swansea, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/553,842

(22) Filed: Apr. 20, 2000

(51) Int. Cl.[7] .............................. H04L 9/00; H04L 9/28
(52) U.S. Cl. ........................................ 380/44; 380/28
(58) Field of Search .............................. 380/44, 45, 46, 380/28, 29

(56) References Cited

U.S. PATENT DOCUMENTS 4,694,407 A * 9/1987 Ogden ........................ 345/441
5,054,066 A * 10/1991 Riek et al. .................... 380/30
5,253,297 A * 10/1993 Press ........................... 713/166

OTHER PUBLICATIONS

Schneier, Bruce; Applied Cryptography; 1996; 2nd Edition; pp. 169–187,265–301,397–428.*

Wikipedia: The Free Encyclopedia; http://en2.wikipedia.org/wili/Inverse_matrix.*

* cited by examiner

Primary Examiner—Gilberto Barrón
Assistant Examiner—Jung Woo Kim
(74) Attorney, Agent, or Firm—James M. Kasischke; Michael P. Stanley; Michael F. Oglo

(57) ABSTRACT

A method for encrypting and decrypting two-dimensional data is provided using a selected fractal a square fractal key matrix size and associated fractal computation initialization values. The fractal key matrix is computed iteratively, changing fractal parameters as necessary, to obtain a full rank fractal key matrix. Data to be encrypted is buffered in a two-dimensional matrix to allow matrix multiplication between the buffered data matrix and the fractal key matrix. The encrypted data, the encrypted data matrix dimensions, and the fractal parameters necessary to regenerate the fractal key are transmitted to a receiver that recreates the fractal key from the fractal parameters. The receiver additionally generates the fractal key matrix inverse. The data is decrypted by a matrix multiplication of the encrypted data and the fractal key matrix inverse.

7 Claims, 2 Drawing Sheets

ENCRYPTION USING FRACTAL KEY

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

(1) Field of the Invention

The present invention relates generally to encryption and decryption, and more particularly to using fractal key generation to encrypt and decrypt two-dimensional data.

(2) Description of the Prior Art

The rapid and parallel development of the telecommunications and computer industries increased requirements for data throughput and analysis. Accordingly, electronic transmission is widely accepted and practiced. Unfortunately, the possibility of electronic mischief, unintentional and intentional, also increases with technological evolution. Parties communicating electronically are therefore increasingly concerned with encrypting transmissions to ensure that an y unintended recipients cannot become privy to transmission contents.

Image data security is of increased importance in the commercial sector with the advent of electronic tax filing, increased fax transmissions, etc. The military similarly has interest in protecting computer screen image transmissions, satellite image transmissions, and other image data communications. In most applications, image data is two-dimensional data; therefore, an image can be considered as two-dimensional memory.

U.S. Pat. No. 5,987,136 to Schipper et al. describes an apparatus for producing a self-authenticating visual image that incorporates positional information with a digital image forming means. The position information is incorporated in the digital image by altering selected pixel bit values for a selected authentication pattern P of pixels in a chosen subset CS of the pixel array; and this selected pattern may be determined using the position information. The position information may be encrypted, using an encryption key based on position information, and may be stored separate from, or as part of, the digital image.

U.S. Pat. No. 5,903,648 to Javidi teaches an image encryption method that multiplies the image by a random phase function. The Fourier transform of the product of the image and the random phase function is then multiplied by another random phase function in the Fourier domain. The inverse Fourier transform is then taken to obtain the encrypted image.

U.S. Pat. No. 5,862,217 to Steinberg et al. provides an in-camera encryption technique for use with digital cameras. Steinberg et al. utilize a password protected encryption generator to encrypt all digital images and ensure that all digital data is stored in encrypted form.

U.S. Pat. No. 5,533,127 to Luther presents two-dimensional data encryption using multiple encryption passes through the data. In each pass through the two-dimensional data having dimensions m rows×n columns, each $m^{th}$ row and each nth column of data is encrypted by complementation of the data in the row or column. For each encryption pass, m and n are randomly selected.

In mathematics, fractals describe curves or surfaces created by repeated subdivisions of the curve or surface. Fractals also include geometric shapes that are infinitely ragged, curvy, or otherwise irregular. Fractal analysis applies to weather forecasting, population growth prediction, and to a greater extent, image compression and analysis.

Fractals exploit the self-similarity that exists across scales or sub-bands of images. Fractal image compression algorithms create a series of transformations which, when applied to a set of data, result in that data approaching a "fixed point" that approximates the original data. To regenerate an approximation of the data using fractal techniques, it is only necessary to know the nature and content of the transformations. The transformations can thus be applied to some initial arbitrary data in an iterative process to transform the arbitrary data into an approximation of the original data. With fractal analysis, therefore, the data is represented by its transformations.

Fractal image processing applications include image boundary correction (U.S. Pat. No. 5,982,386), fractal image coding (U.S. Pat. Nos. 5,924,053 and 5,093,678), image compression (U.S. Pat. Nos. 5,862,264, 5,862,263, and 5,857,036), and medical image analysis (U.S. Pat. No. 5,848,198). Because image data is two-dimensional, image data demand large memory segments. The iterative nature of fractal processing is therefore desirable for processing such data.

There is currently no fractal application or method that provides encryption and decryption of two-dimensional data.

What is needed is a fractal method to encrypt and subsequently decrypt, two-dimensional data.

SUMMARY OF THE INVENTION

It is a general purpose and object of the present invention to utilize fractals to generate a fractal key matrix.

It is another object of the present invention to use the generated fractal key to encrypt a matrix of two-dimensional data.

It is yet another object of the present invention to describe a method by which a receiver may obtain the encrypted data with fractal key parameters, reconstruct the fractal key, and decrypt the encrypted data.

Other objects and advantages of the present invention will become more obvious hereinafter in the specification and drawings.

These objects are accomplished with the present invention by a method for encrypting and decrypting two-dimensional data. A fractal and associated fractal computation initialization values are selected, with a square fractal key matrix. The fractal key matrix is computed iteratively, changing fractal parameters as necessary, to obtain a full rank fractal key matrix. Data to be encrypted is buffered in a two-dimensional matrix to allow matrix multiplication between the buffered data matrix and the fractal key matrix. The encrypted data, the encrypted data matrix dimensions, and the fractal parameters necessary to regenerate the fractal key are transmitted to a receiver that recreates the fractal key from the fractal parameters. The receiver additionally generates the fractal key matrix inverse. The data is decrypted by a matrix multiplication of the encrypted data and the fractal key matrix inverse.

BRIEF DESCRIPTION OF THE DRAWINGS

A more complete understanding of the invention and many of the attendant advantages thereto will be readily

DESCRIPTION OF THE PREFERRED EMBODIMENT

Although the preferred embodiment shall be discussed with relation to image data, the disclosed invention applies to any data, with the only requirement being that,the data must be organized or capable of being organized in a two-dimensional matrix.

Figure 1:
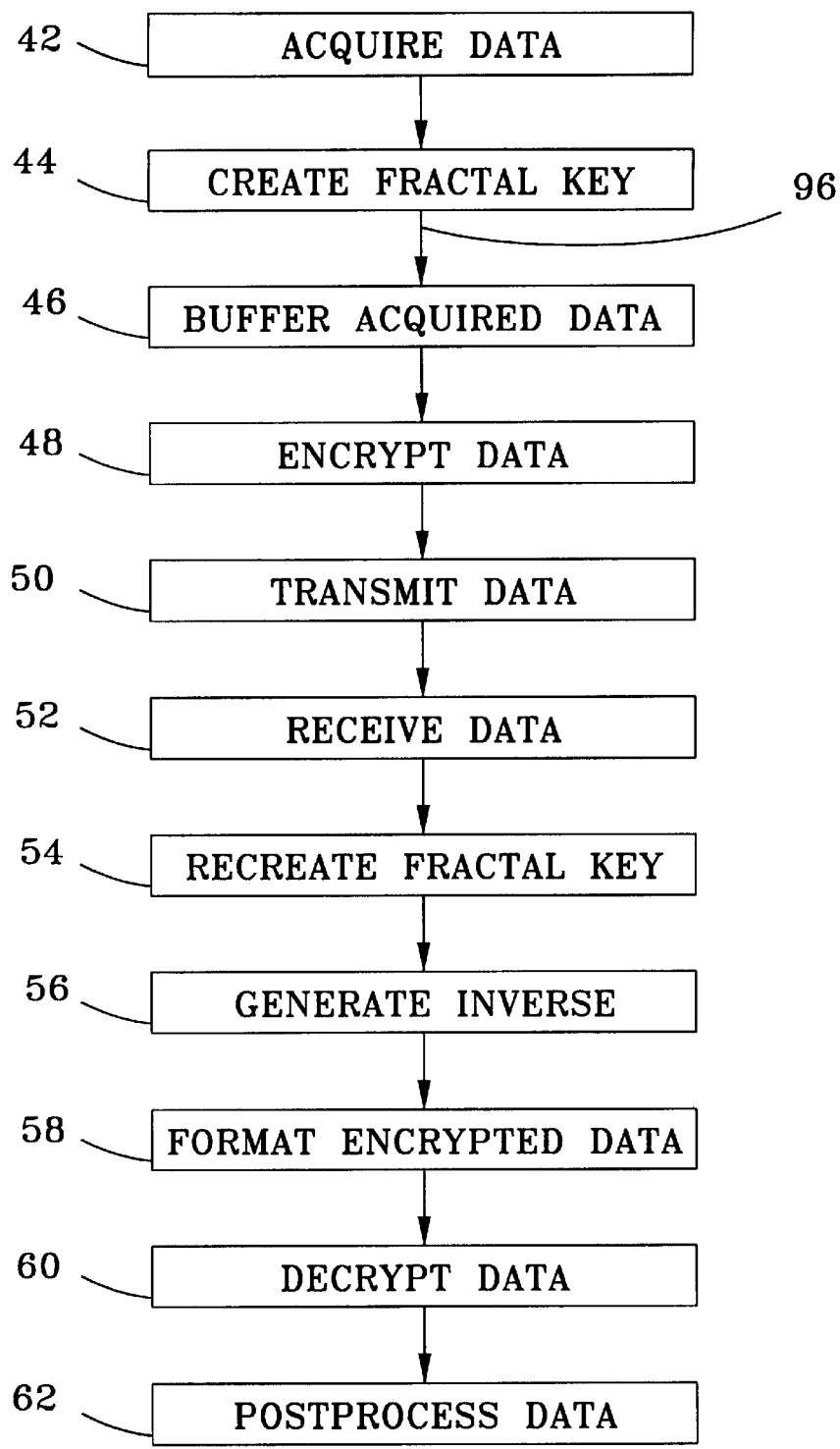
FIG. 1 is a block diagram of the fractal key encryption and decryption.

Referring now to FIG. 1, there is shown a block diagram of the fractal key encryption and decryption 40. After the data is acquired 42, the fractal key must be created 44. Fractal key generation is an iterative process, described further in relation to FIG. 2, which will result in a full rank fractal key matrix.

Once a full rank fractal key is generated, the original data is buffered 46 to form a two-dimensional matrix. The buffered data matrix dimensions are not arbitrary, and must allow for matrix multiplication between the buffered data matrix and the fractal key matrix. The fractal key matrix is a square matrix of dimension (N×N). It is a necessary condition that one dimension of the buffered data matrix is N. The buffered data matrix may therefore be of dimension (J×N) or (N×J), where J may be any positive integer including N.

For a buffered data matrix of size (J×N), encryption 48 uses matrix multiplication according to Equation 1:

$$E=P*K \quad (1)$$

where:

P=the buffered data matrix (J×N);

K=the fractal key matrix (N×N);

* indicates matrix multiplication; and

E=the encrypted data matrix (J×N).

Alternately, for a buffered data matrix P of dimension (N×J) encryption 48 uses matrix multiplication according to Equation 2:

$$E=K*P, \quad (2)$$

providing an encrypted data matrix of dimension (N×J).

Once the data is encrypted 48, it may be transmitted 50 to the receiver with the fractal key parameters as will be described in relation to FIG. 2. The transmitted fractal key parameters must contain all information necessary for the receiver to generate the fractal key, including but not limited to the fractal choice, any fractal initialization values, the fractal key matrix size (i.e., N), and the encrypted data matrix size (i.e., (J×N), (N×J)). If the encrypted data is a subset of larger data, information regarding the data subset is required. Alternately, certain information may be determined a priori and stored at the source and receiver, thus eliminating the need to transmit the information. Such information may include the values of N and J, the fractal choice, the subdivisions of data, etc.

Once the receiver obtains the fractal parameters 52, the receiver re-generates the fractal key matrix at 54 using the received (or stored a priori) fractal parameters, and computes the inverse fractal key matrix 56. Because the fractal key matrix is originally selected to be dimension (N×N), the inverse fractal key matrix is also dimension (N×N).

To perform data decryption, the receiver must organize, or format the encrypted data at 58 into the same two-dimensional matrix as the encrypted data matrix. The encrypted data is decrypted 60 using the inverse fractal key matrix and matrix multiplication as given by Equation 3 or 4. If the encryption 48 was performed using Equation 1, i.e., E is a J×N size matrix, the decryption 60 is performed using Equation 3:

$$P=E*K^{-1} \quad (3)$$

where $K^{-1}$ is the inverse fractal key matrix, such that P is the matrix of decrypted, original, buffered data of dimension J×N.

Alternately, if the encryption 48 was performed using Equation 2, i.e., E is a N×J size matrix, the decryption 60 is performed using Equation 4:

$$P=K^{-1}*E \quad (4)$$

such that P is the matrix of decrypted, original, buffered data of dimension N×J.

Once the data is decrypted 60, the decrypted data may require reformatting or post-processing 62 according to the buffering scheme, etc., and depending upon the application. For example, if a larger image is encrypted into smaller units and transmitted in segments, overlapping may occur. Additionally, the receiver may preprocess the received data before decrypting, such preprocessing to include filtering and decoding.

Figure 2:
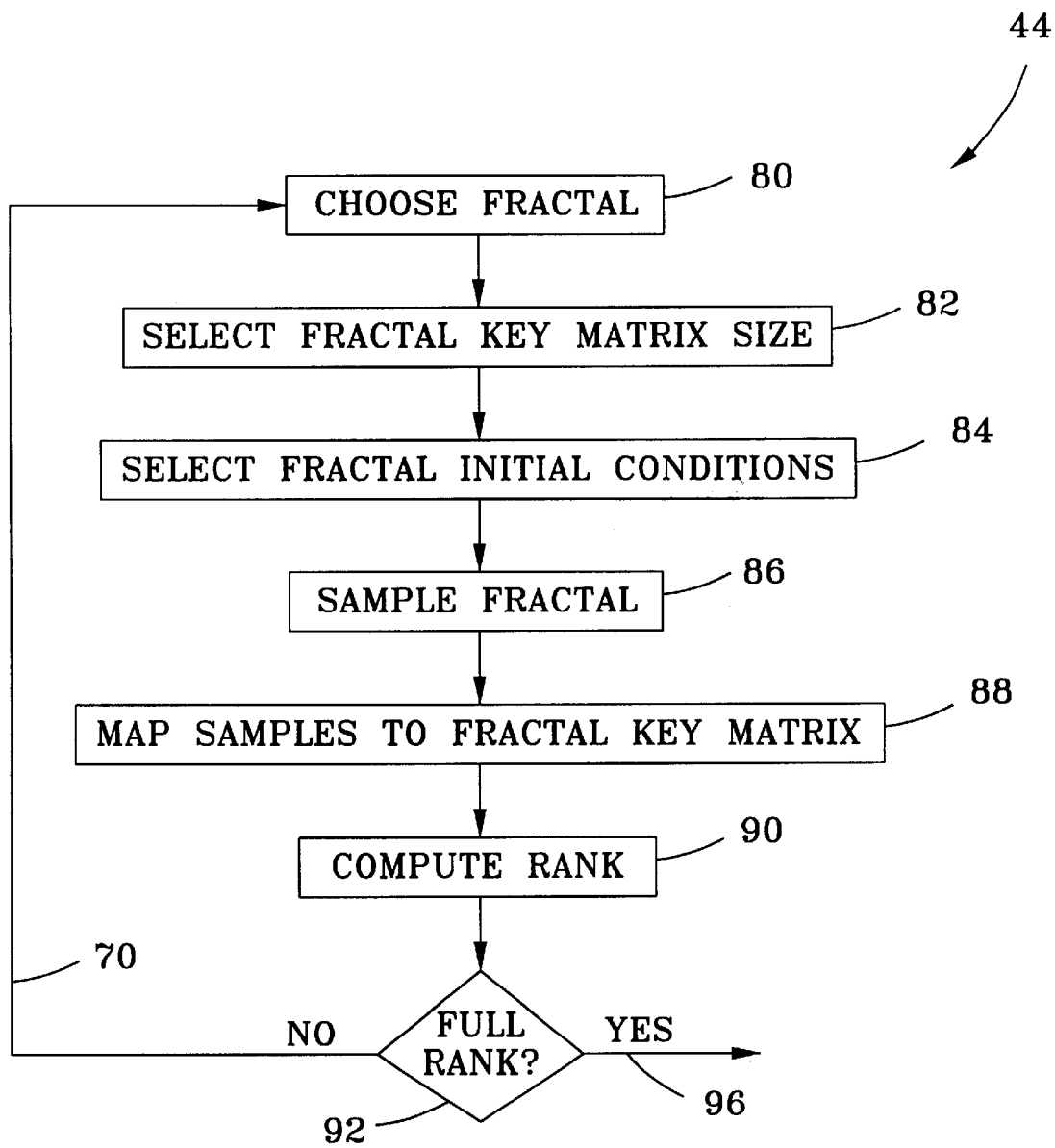
FIG. 2 is a block diagram demonstrating fractal key generation.

Referring now to FIG. 2, there is shown a block diagram for creating, or generating the fractal key 44. The process is iterative as indicated at 70 and continues until a fractal key matrix with full rank is computed. A matrix having full rank is a matrix with all rows linearly independent. The process 44 begins by choosing at 80 the fractal that shall form the basis for the fractal key and selecting the fractal key matrix size at 82. There are many different fractals, and an example of one of the best known is the Mandelbrot. Any fractal may be selected, considering the data to be encrypted and the application for which the encryption is needed.

Once the fractal is chosen and the fractal key matrix size is selected, the fractal initial conditions can be determined at 84. The fractal initial conditions may vary depending upon the chosen fractal and fractal key matrix size, as the fractal initial conditions determine how the fractal is computed and sampled. Fractal initial conditions may include the starting location within the fractal image and the resolution, or interval, to sample the fractal. Once the initial conditions are selected at 84, the fractal is then sampled 86 and mapped to the fractal key matrix 88. The mapping of a fractal to an image is well known, and the preferred embodiment generates the fractal key matrix by sampling the fractal, or fractal image, or a portion thereof. The number of fractal image samples must equal the number of elements in the fractal key matrix. For example, for a fractal key matrix of size 50×50, 2500 samples of the specified fractal are required to compose the fractal key matrix.

Once the fractal key matrix is formed, the rank of the fractal key matrix is computed at 90 and tested at 92 to determine if the fractal key matrix is full rank. If not full rank, the fractal key generation process must be reiterated 70 with different fractal parameters. The objective of fractal key generation is a full rank fractal key matrix. If a full rank fractal key is not obtained in the first pass, one or more of the fractal parameters must be changed, i.e., the fractal selected 80, the fractal key matrix size 82, and/or the fractal initial conditions 84. The aforementioned parameters must continue to be changed, individually or in combination, with each parameter perturbation followed by fractal key matrix generation, until a full rank fractal key matrix is developed, whereupon the encryption process 40 of FIG. 1 continues as indicated by 96.

For example, consider an image that requires encryption and transmission to another location. The image may be of size (100×100) pixels. If the Mandelbrot fractal is selected to form the fractal key matrix and it is desired to encrypt the entire image in one matrix computation, a fractal key matrix of dimension (100×100) must be formed. The Mandelbrot fractal requires specifying an initial condition that is selected to be 0, and a bailout loop limit that is selected to be 1000. The remaining fractal parameters include specifying the sampling limits. The fractal shall be sampled along the horizontal region between −0.25 and +0.75, and the vertical region between −1 and +1. Since the fractal key matrix is dimension (100×100), the Mandelbrot fractal image shall be sampled at intervals of 0.01 on the horizontal axis, or x-axis, and every 0.02 on the vertical axis, or y-axis, to comprise a fractal key matrix of size (100×100).

The sample pseudocode for generating the fractal key follows:

Begin fractal key computation routine
For x=(−0.25) to (+0.75) in steps of 0.01
For y=(−1.0) to (+1.0) in steps of 0.02
  Z=0;
  For j=1 to bailout=1000
    z=z^2+x+y*i; /* i=squareroot(−1) */
  Next j;
  If abs(z) is outside the fractal, translate point accordingly;
  Else map point to fractal;
Next Y;
Next X;
End fractal key computation routine In the above routine, the fractal key is computed using the complex arithmetic formula for the Mandelbrot fractal, there being an additional translation of the computed value.

Once the fractal values are computed and mapped to the fractal key matrix, the fractal key matrix rank must be determined. If the fractal key matrix does not have full rank, the fractal construction parameters must be changed. If the fractal key matrix dimensions are changed, however, the objective of complete image encryption through a single matrix multiplication could not be achieved. In this instance, changing the fractal key matrix size is therefore not advised because a single encryption operation is desired. Alternately, a different portion of the fractal could be sampled to form the fractal key matrix. The sampling area changes by altering the horizontal and/or vertical loop start and/or end points. Additionally, the horizontal and vertical loop step sizes could change to sample at a different interval. The fractal choice may also change from Mandelbrot to some other fractal.

Once a full rank fractal matrix key is generated, the matrix multiplication between the data and the fractal key occurs as given by equations 1 or 2. The encrypted data and fractal parameters may then be transmitted.

Assuming that the fractal parameters are not established a priori, then the fractal parameters are transmitted with the encrypted data. For this example, the parameters must include some indicator of the fractal selected (Mandelbrot), the "x-loop" indices and step value (−0.25, +0.75, 0.01), the "y-loop" indices and step value (−1, +1, 0.02), the bailout number (1000), the initial condition of z=0 and the data matrix size (100×100). While the values of the parameters may not be known prior to receiving the encrypted message, the format for transmitting the parameters would have been established beforehand. Once the receiver obtains the fractal parameters, the receiver can regenerate the fractal key matrix, obtain the inverse, and decrypt the encrypted data using a matrix multiply as given by equations 3 or 4.

The advantage of the present invention over the prior art is that the present invention utilizes fractals to form a key that allows encryption and decryption of two-dimensional data. Fractals and their manipulations are well known and the iterative nature of the fractal results in a simple method of generating an encryption key.

What has thus been described is a method for encrypting and decrypting two-dimensional data. A fractal and associated fractal computation initialization values are selected, with a square fractal key matrix. The fractal key matrix is computed iteratively, changing fractal parameters as necessary, to obtain a full rank fractal key matrix. Data to be encrypted is buffered in a two-dimensional matrix to allow matrix multiplication between the buffered data matrix and the fractal key matrix. The encrypted data, the encrypted data matrix dimensions, and the fractal parameters necessary to regenerate the fractal key are transmitted to a receiver that recreates the fractal key from the fractal parameters. The receiver additionally generates the fractal key matrix inverse. The data is decrypted by a matrix multiplication of the encrypted data and the fractal key matrix inverse.

Although the present invention has been described relative to a specific embodiment thereof, it is not so limited. Obviously many modifications and variations of the present invention may become apparent in light of the above teachings. For example, although image data was discussed, any data capable of being formatted in two dimensions may be encrypted using the described method. Larger or non-square images or other two-dimensional data may be processed in smaller, overlapping or non-overlapping segments. When multiple segments are encrypted, the multiple segments may each be encrypted before any are transmitted, alternately one segment may be transmitted before the next is encrypted. If data is divided into multiple segments that are encrypted individually, the same fractal key may be used for all data segments, or multiple fractal keys may be used. Any fractal is sufficient depending upon the application and the necessary condition to obtain a fractal key matrix with full rank. The data to be encrypted, and the fractal key, may consist of real or complex numbers. Although the preferred embodiment transmitted the encrypted data matrix size with the encrypted data, this information may be established a priori. Additionally, the encrypted data matrix dimensions may change between transmissions. The fractal key matrix dimensions may also change with each transmission. Operations such as data filtering and amplification may be performed at the receiver to enhance data transmission. Similarly techniques including error correction encoding/decoding, block interleaving, etc., may be utilized to enhance communication between the source and receiver.

Many additional changes in the details, materials, steps and arrangement of parts, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A method for encrypting input data comprising the steps of:

generating a two-dimensional fractal key of size N rows by size N columns, said N being a positive integer greater than one wherein said generating step includes mathematically constructing a fractal by identifying a fractal type and selecting fractal initial condition parameters corresponding to said identified fractal type, mapping said fractal to said fractal key, determining a fractal key rank with said fractal key rank being the number of linearly independent rows of said fractal key, exiting when said fractal key has full rank with said full rank established when said rank equals said N, iteratively modifying at least one parameter associated with said fractal and said mapping and returning to mathematically constructing a fractal when said rank is not equal to N;

buffering said input data in a two-dimensional matrix format having at least one dimension of size N; and encrypting said buffered data by matrix multiplying said buffered data and said fractal key.

2. The method of claim 1, wherein mapping said fractal to said fractal key, further comprises:

determining a sampling region of said fractal;

determining at least one sampling interval such that sampling the fractal at said at least one sampling interval over said sampling region provides a total number of samples equal to the size N×N of said fractal key;

computing fractal values of the fractal for each sample; and populating said fractal key with said computed fractal values in a manner corresponding a sample location in the fractal with a matrix location in the fractal key.

3. The method of claim 2, further comprising:

transmitting said encrypted data to a receiver;

recreating said fractal key at said receiver;

generating a two-dimensional fractal key inverse from said recreated fractal key;

formatting said received encrypted data in matrix format matching said encrypted data format; and decrypting said received encrypted data at said receiver by matrix multiplying said matrix format encrypted data and said fractal key inverse to obtain said input data.

4. The method of claim 3, wherein transmitting the encrypted data further comprises transmitting the fractal key size N and the dimensions of the buffered data matrix.

5. The method of claim 3, wherein transmitting the encrypted data further comprises transmitting said at least one parameter.

6. The method of claim 4, wherein transmitting the encrypted data further comprises transmitting said at least one parameter.

7. The method of claim 6, wherein transmitting the encrypted data further comprises transmitting said fractal type, said sampling region and said sampling interval.

* * * * *